US010783887B2

(12) United States Patent
Kim

(10) Patent No.: US 10,783,887 B2
(45) Date of Patent: Sep. 22, 2020

(54) APPLICATION PROCESSOR INCLUDING LOW POWER VOICE TRIGGER SYSTEM WITH EXTERNAL INTERRUPT, ELECTRONIC DEVICE INCLUDING THE SAME AND METHOD OF OPERATING THE SAME

(71) Applicant: SAMSUNG ELECTRONICS CO., LTD., Suwon-si (KR)

(72) Inventor: Sun-Kyu Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 133 days.

(21) Appl. No.: 16/193,029

(22) Filed: Nov. 16, 2018

(65) Prior Publication Data
US 2019/0228768 A1 Jul. 25, 2019

(30) Foreign Application Priority Data

Jan. 25, 2018 (KR) .................. 10-2018-0009519

(51) Int. Cl.
| | |
|---|---|
| *G10L 15/22* | (2006.01) |
| *G06F 9/48* | (2006.01) |
| *G06F 1/06* | (2006.01) |
| *G06F 13/24* | (2006.01) |
| *G10L 25/84* | (2013.01) |
| *G10L 15/08* | (2006.01) |
| *G06F 13/42* | (2006.01) |

(52) U.S. Cl.
CPC ............. *G10L 15/22* (2013.01); *G06F 1/06* (2013.01); *G06F 9/4812* (2013.01); *G06F 13/24* (2013.01); *G06F 13/4282* (2013.01); *G10L 15/08* (2013.01); *G10L 25/84* (2013.01); *G06F 2213/0042* (2013.01); *G10L 2015/088* (2013.01)

(58) Field of Classification Search
CPC ........................................ G10L 15/22
USPC ........................................ 704/237
See application file for complete search history.

(56) References Cited

U.S. PATENT DOCUMENTS

| 7,617,386 B2 | 11/2009 | May et al. |
|---|---|---|
| 2014/0222436 A1 | 8/2014 | Binder et al. |
| 2015/0221307 A1 | 8/2015 | Shah et al. |
| 2016/0155443 A1 | 6/2016 | Khan et al. |

(Continued)

FOREIGN PATENT DOCUMENTS

| JP | 5902068 B2 | 4/2016 |
|---|---|---|
| KR | 10-2016-0127165 A | 11/2016 |

(Continued)

*Primary Examiner* — Susan I McFadden
(74) *Attorney, Agent, or Firm* — Sughrue Mion, PLLC

(57) ABSTRACT

An application processor is provided. The application processor includes a system bus, a host processor, a voice trigger system, and an interrupt pad. The host processor is electrically connected to the system bus. The voice trigger system is electrically connected to the system bus and performs a voice trigger operation and issues a trigger event based on a trigger input signal that is provided through a trigger interface. The interrupt pad receives a first interrupt signal in response to an operating environment changing from a low noise environment to a noisy environment, and a part of the voice trigger system is changed from an idle state to a normal state to perform the voice trigger operation in response to the first interrupt signal being received.

20 Claims, 13 Drawing Sheets

(56) References Cited

U.S. PATENT DOCUMENTS

| | | |
|---|---|---|
| 2017/0116987 A1 | 4/2017 | Kang et al. |
| 2017/0242478 A1 | 8/2017 | Ma |
| 2017/0244942 A1 | 8/2017 | Ma |
| 2017/0262395 A1 | 9/2017 | Thanigasalam et al. |
| 2019/0019511 A1* | 1/2019 | Kawano .................. G10L 15/00 |

FOREIGN PATENT DOCUMENTS

| | | |
|---|---|---|
| KR | 10-2017-0046958 A | 5/2017 |
| KR | 10-2017-0097585 A | 8/2017 |

* cited by examiner

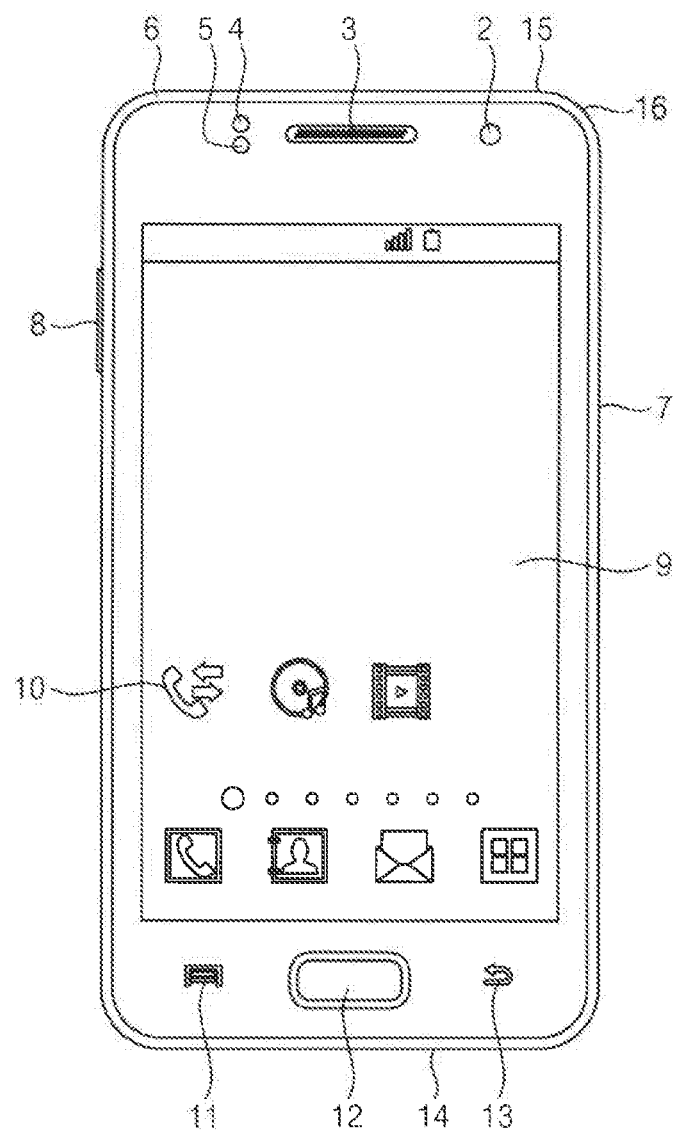

APPLICATION PROCESSOR INCLUDING LOW POWER VOICE TRIGGER SYSTEM WITH EXTERNAL INTERRUPT, ELECTRONIC DEVICE INCLUDING THE SAME AND METHOD OF OPERATING THE SAME

CROSS-REFERENCE TO RELATED APPLICATION

This application claims priority under 35 USC § 119 to Korean Patent Application No. 10-2018-0009519, filed on Jan. 25, 2018 in the Korean Intellectual Property Office (KIPO), the disclosure of which is incorporated by reference herein in its entirety.

BACKGROUND

1. Technical Field

Apparatuses, systems, methods, devices, and articles of manufacture consistent with the present disclosure relate generally to semiconductor integrated circuits, and more particularly to application processors including low power voice trigger systems with external interrupts, electronic devices including the application processors, and methods of operating the application processors.

2. Description of the Related Art

Recently, voice-based or sound-based intelligent interfaces have been introduced. One advantage of such voice-based intelligent interfaces is that users can interact with a device in a hands-free manner without handling or even looking at the device. Hands-free operation can be particularly beneficial when a person cannot or should not physically handle a device, such as when they are driving or when they have a physical disability, etc. However, to initiate the voice-based intelligent interface, users typically must press a button or select an icon on a touch screen. This tactile input detracts from the user experience of the voice-based intelligent interface.

Accordingly, the electronic devices have been developed to activate a voice-based intelligent interface using inputs of voice, speech, sound, sensing, etc., rather than a tactile input. The electronic device performs continuous or intermittent monitoring of an audio channel to detect the voice input and issue a trigger event for initiating the voice-based intelligent interface. The operation for issuing the trigger event may be referred to as a voice trigger operation. This monitoring of the audio channel consumes electrical power, which is a limited resource on handheld or portable devices that rely on batteries. Thus, it is advantageous to provide an energy-efficient solution associated with the voice trigger operation.

SUMMARY

It is an aspect to provide an application processor that includes a voice trigger system capable of performing a voice trigger operation with low power and supporting an external interrupt.

It is another aspect to provide an electronic device including the application processor.

It is another aspect to provide a method of operating the application processor.

According to an aspect of one or more example embodiments, an application processor comprises a system bus; a host processor electrically connected to the system bus; a voice trigger system electrically connected to the system bus, the voice trigger system being configured to perform a voice trigger operation and issue a trigger event based on a trigger input signal that is provided through a trigger interface; and an interrupt pad configured to receive a first interrupt signal in response to an operating environment changing from a low noise environment in which an external sound pressure is less than a reference sound pressure, to a noisy environment in which the external sound pressure is greater than or equal to the reference sound pressure, and wherein at least a part of the voice trigger system is changed from an idle state to a normal state to perform the voice trigger operation in response to the first interrupt signal being received.

According to another aspect of one or more example embodiments, an electronic device comprises at least one audio input-output device; and an application processor comprising a system bus; a host processor electrically connected to the system bus; a voice trigger system electrically connected to the system bus, the voice trigger system being configured to perform a voice trigger operation and issue a trigger event based on a trigger input signal that is provided from the at least one audio input-output device through a trigger interface; and an interrupt pad configured to receive a first interrupt signal from the at least one audio input-output device when an operating environment of the electronic device is changed from a low noise environment in which an external sound pressure is less than a reference sound pressure, to a noisy environment in which the external sound pressure is greater than or equal to the reference sound pressure, and wherein at least a part of the voice trigger system is changed from an idle state to a normal state to perform the voice trigger operation in response to the first interrupt signal being received.

According to another aspect of one or more example embodiments, a method of operating an application processor comprises performing, by a voice trigger system, a voice trigger operation based on a trigger input signal provided through a trigger interface to issue a trigger event, the voice trigger system being integrated with a host processor, an interrupt pad and a system bus electrically connecting the host processor and the voice trigger system in a single semiconductor chip forming the application processor; receiving a first interrupt signal through the interrupt pad when an operating environment is changed from a low noise environment in which an external sound pressure is less than a reference sound pressure, to a noisy environment in which the external sound pressure is greater than or equal to the reference sound pressure; and changing at least a part of the voice trigger system from an idle state to a normal state to perform the voice trigger operation in response to the first interrupt signal being received.

BRIEF DESCRIPTION OF THE DRAWINGS

Illustrative, non-limiting example embodiments will be more clearly understood from the following detailed description taken in conjunction with the accompanying drawings, in which:

FIG. 2B is an example implementation of the electronic device of FIG. 2A;

DETAILED DESCRIPTION

Figure 1:
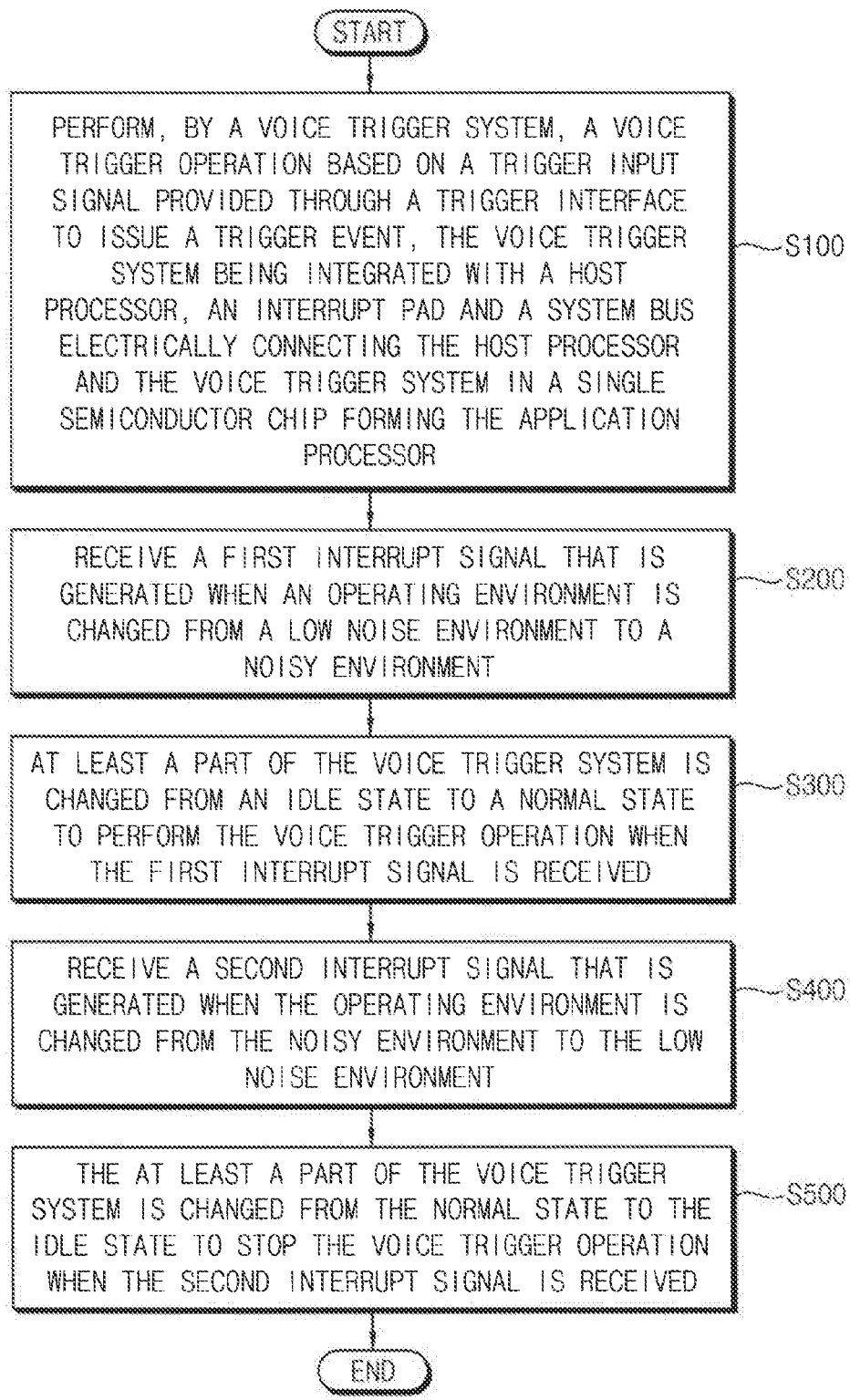
FIG. 1 is a flow chart illustrating a method of operating an application processor according to example embodiments.

Various example embodiments will be described more fully with reference to the accompanying drawings, in which example embodiments are shown. The present disclosure may, however, be embodied in many different forms and should not be construed as limited to the example embodiments set forth herein. Like reference numerals refer to like elements throughout this application.

The application processor, the electronic device including the application processor and the method of operating the application processor according to example embodiments may perform the voice trigger operation with low power and high efficiency by integrating the voice trigger system in the application processor. The on-chip voice trigger system may perform some operations instead of a host processor in the application processor, to reduce the power consumption and enhance the performance of the electronic device. That is, the host processor may off-load some operations related to the voice trigger operation to the voice trigger system in order to reduce power consumption and enhance the performance of the electronic device.

In addition, the at least a part of the voice trigger system may be changed from the idle state to the normal state based on the first interrupt signal that is received through the interrupt pad separated from the pads receiving the trigger input signal and/or the audio input-output pads and is generated when the operating environment is changed from the low noise environment to the noisy environment. Further, the at least a part of the voice trigger system may be changed from the normal state to the idle state based on the second interrupt signal that is received through the interrupt pad and is generated when the operating environment is changed from the noisy environment to the low noise environment. Accordingly, overall power consumption of the voice trigger system may be further reduced.

FIG. 1 is a flow chart illustrating a method of operating an application processor according to example embodiments.

Referring to FIG. 1, in an application processor in which a host processor, a voice trigger system, an interrupt pad and a system bus electrically connecting the host processor and the voice trigger system are integrated as a single semiconductor chip, a voice trigger operation is performed by the voice trigger system based on a trigger input signal provided through a trigger interface to issue a trigger event (step S100).

The voice trigger operation in this disclosure may indicate an operation to monitor whether the trigger input signal includes a particular trigger sound and issue a trigger event such as an interrupt signal to initiate a voice recognition mode or a voice-based intelligent interface when the trigger sound is detected. The initiation of the voice recognition mode may include launching the host processor and/or the system bus into an active mode. In other words, to reduce power consumption, the voice trigger operation may be performed during a sleep mode (e.g., while the system bus and the host processor are disabled and only the voice trigger system is enabled), and the system bus and the host processor may enter or wake up into the active mode when the trigger event is issued to initiate the voice recognition mode.

In some example embodiments, the trigger sound may include a word and/or a phrase of a human voice. In other example embodiments, the trigger sound may include sounds other than the human voice such as a whistle, a sound of hand clapping, a siren, a sound of collision, a sound wave of a particular frequency range, etc.

At least a part of the voice trigger system may be in an idle state during a low noise environment in which an external sound pressure is lower than a reference sound pressure. In some example embodiments, the low noise environment may be a silence environment. The voice trigger system may determine whether an operating environment is the low noise environment, e.g., based on a software configuration by itself or based on an external interrupt as will be described in steps S400 and S500.

The interrupt pad receives a first interrupt signal when the operating environment is changed from the low noise environment to a noisy environment in which the external sound pressure is greater than or equal to the reference sound pressure (step S200).

The at least a part of the voice trigger system is changed from the idle state to a normal state to perform the voice trigger operation when the first interrupt signal is received (step S300).

The interrupt pad may receive a second interrupt signal when the operating environment is changed from the noisy environment to the low noise environment (step S400). The second interrupt signal is different from the first interrupt signal.

The at least a part of the voice trigger system may be changed from the normal state to the idle state to stop the voice trigger operation when the second interrupt signal is received (step S500).

The application processor, the electronic device including the application processor and the method of operating the application processor according to example embodiments may perform the voice trigger operation with low power and high efficiency by integrating the voice trigger system in the application processor. In addition, the at least a part of the voice trigger system may be changed from the idle state to the normal state or changed from the normal state to the idle state based on the interrupt signals that are received through the separate interrupt pad, and thus overall power consumption of the voice trigger system may be further reduced.

Figure 2A:
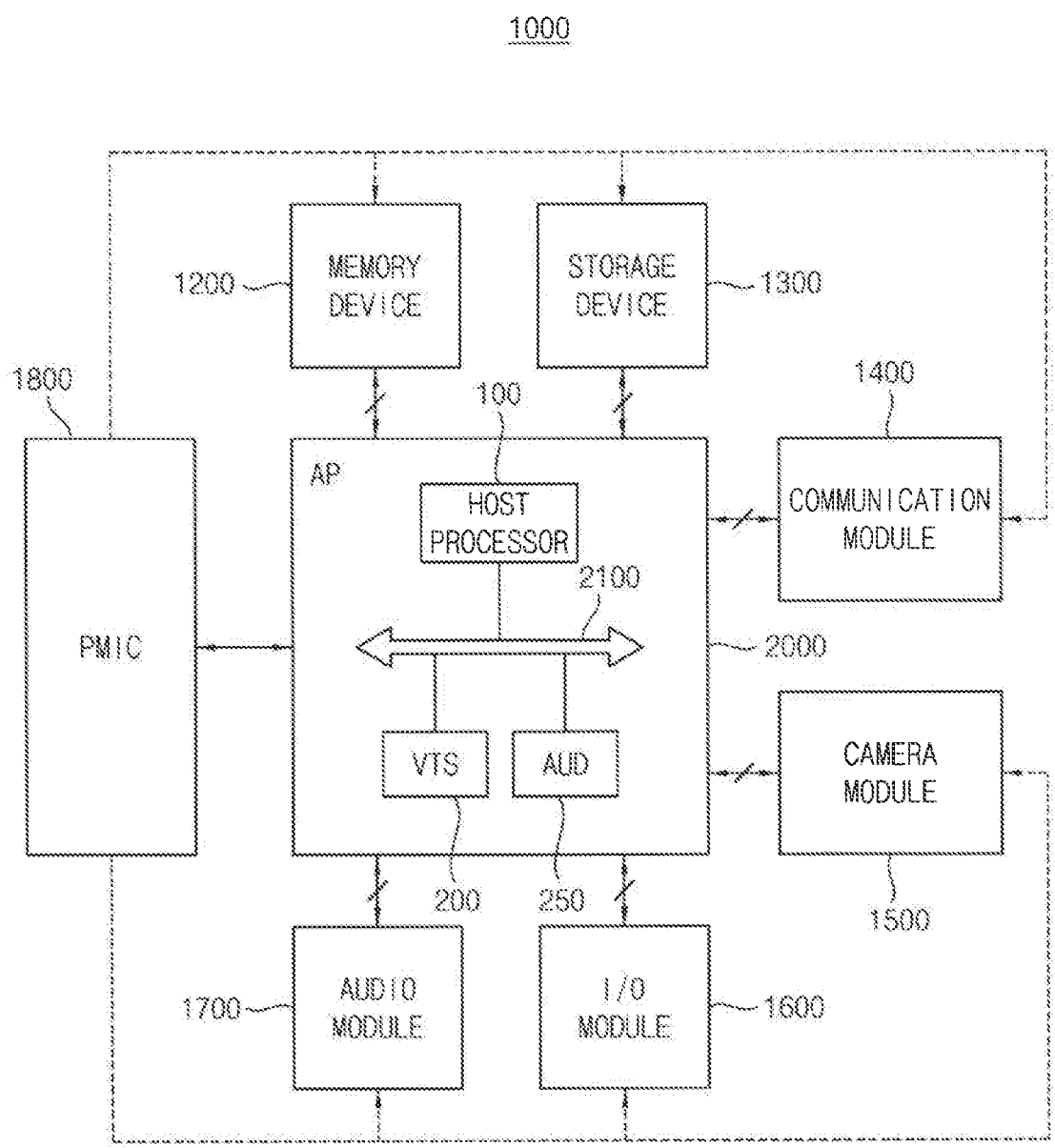
FIG. 2A is a block diagram illustrating an electronic device according to example embodiments.

FIG. 2A is a block diagram illustrating an electronic device according to example embodiments.

Referring to FIG. 2A, an electronic device 1000 includes an application processor AP 2000, a memory device 1200, a storage device 1300, a plurality of functional modules, including a communication module 1400, a camera module

1500, an input/output (I/O) module 1600 and an audio module 1700, and a power management integrated circuit PMIC 1800.

The application processor 2000 controls overall operations of the electronic device 1000. For example, the application processor 2000 may control the memory device 1200, the storage device 1300 and the plurality of functional modules 1400, 1500, 1600 and 1700. The application processor 2000 may be a system on chip (SoC).

The application processor 2000 may include a system bus 2100, a host processor 100 (also called a central processing unit (CPU)), a voice trigger system VTS 200 and an audio processing system AUD 250, which are electrically connected to the system bus 2100.

The voice trigger system 200 may be electrically connected to the system bus 2100, perform a voice trigger operation and issue a trigger event based on a trigger input signal that is provided through a trigger interface. The audio processing system 250 may include an audio subsystem and may further include a sensor hub as will be described below. The audio subsystem may be electrically connected to the system bus 2100 to process audio streams that are replayed or recorded through an audio interface. In addition, the audio subsystem may further support the transfer of the audio streams between the audio interface and the memory device 1200. Example embodiments of the voice trigger system 200 and the audio processing system 250 will be described below with reference to FIGS. 3 through 11B.

The memory device 1200 and the storage device 1300 may store data for operations of the electronic device 1000. The memory device 1200 may include a volatile memory device, such as a dynamic random access memory (DRAM), a static random access memory (SRAM), a mobile DRAM, etc. The storage device 1300 may include a nonvolatile memory device, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. In some example embodiments, the storage device 1300 may further include an embedded multimedia card (eMMC), a universal flash storage (UFS), a solid state drive (SSD), a hard disk drive (HDD), a CD-ROM, etc.

The functional modules 1400, 1500, 1600 and 1700 may perform various functions of the electronic device 1000. For example, the electronic device 1000 may include the communication module 1400 that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for a microwave access (WIMAX) module, etc.), the camera module 1500 that performs a camera function, the input-output (I/O) module 1600 including a display module that performs a display function and a touch panel module that performs a touch sensing function, and the audio module 1700 including a microphone (MIC) module, a speaker module, etc. that performs input-output of audio signals. In some example embodiments, the electronic device 1000 may further include a global positioning system (GPS) module, a gyroscope module, etc. However, the functional modules 1400, 1500, 1600 and 1700 in the electronic device 1000 are not limited thereto.

The power management integrated circuit 1800 may provide an operating voltage to the application processor 2000, the memory device 1200, the storage device 1300 and the functional modules 1400, 1500, 1600 and 1700.

FIG. 2B is an example implementation of the electronic device of FIG. 2A.

The electronic device 1000 of FIG. 2A may be a device, such as a desktop computer, a laptop computer, a cellular phone, a smart phone, an MP3 player, a personal digital assistant (PDA), a portable multimedia player (PMP), a digital television, a digital camera, a server computer, a workstation, a set-top box, a portable game console, a navigation system, a wearable device, an internet of things (IoT) device, an internet of everything (IoE) device, an e-book, a virtual reality (VR) device, an augmented reality (AR) device, etc. The electronic device 1000 may typically be operated in response to direct user input, but may also be used to communicate with other devices via the Internet or other network systems. FIG. 2B illustrates a cellular phone or a smart phone including a touch screen as an example of the electronic device 1000 of FIG. 2A.

Referring to FIG. 2B, an electronic device 1000a includes a front camera 2, a speaker 3, a proximity sensor 4, a luminance sensor 5, a universal serial bus (USB) interface 6, a power button 7, a volume button 8, a display and touch screen 9, icons 10, a menu button 11, a home button 12, a back button 13, a microphone 14, an audio output interface 15, and an antenna 16.

The front camera 2 may face in a direction in which the display and touch screen 9 and is used for a video call or video or photo shooting. The speaker 3 may output audio data when a user plays multimedia data by touching the display and touch screen 9 on one of the icons 10 or inputting a signal by speech, talks with another user over a public switched telephone network, or plays an operation sound of the electronic device 1000a or a notification sound. The proximity sensor 4 may control on or off of the display and touch screen 9 in order to save power and prevent miss-operation when a user holds the electronic device 1000a up to an ear for telephone conversation. The luminance sensor 5 may control the operations of the display and touch screen 9 and the front camera 2 according to the quantity of incident light from the surroundings of the electronic device 1000a. The USB interface 6 may be an input/output interface for data communication with external devices and power supply.

The power button 7 may turn on or off the power of the electronic device 1000a or may turn on or off the display and touch screen 9. The volume button 8 may control the audio output of the speaker 3. The icons 10 corresponding to different functions may be displayed on the display and touch screen 9. For example, a user may touch an icon 10 corresponding to playback of multimedia data.

The menu button 11 may allow a user to browse a menu including icons and settings. The home button 12 may allow a home screen to appear for multi-working mode even while the electronic device 1 is performing a certain operation on the display and touch screen 9. The back button 13 may cancel an operation which is currently being performed by the electronic device 1000a and returns a user to a previous screen.

The microphone 14 may be an input-output (I/O) interface for voice calls or voice input signals. The audio output interface 15, e.g., an earphone jack, may be for audio output of multimedia data which is being played. Although not shown, audio output and microphone input may be interfaced through a device supporting Bluetooth. The antenna 16 may be used to receive digital media broadcasting service. The elements of the electronic device 1000a may be embodied in various ways realizable to those of ordinary skill in the art. Some of the elements in FIG. 2B may be omitted or replaced with other elements.

Figure 3:
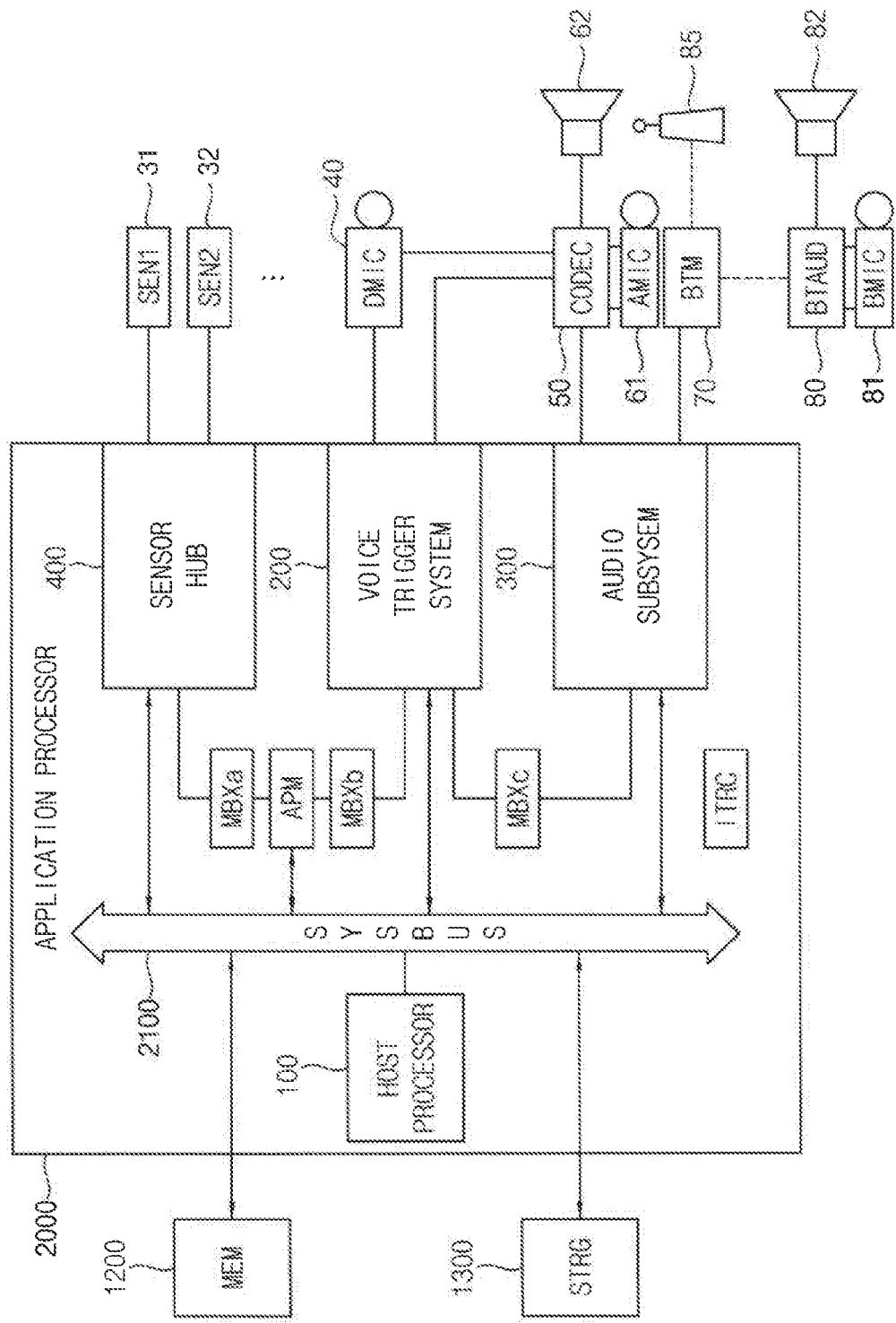
FIG. 3 is a block diagram illustrating an application processor according to example embodiments.

FIG. 3 is a block diagram illustrating an application processor according to example embodiments.

Referring to FIG. 3, an application processor 2000 may include a system bus SYSBUS 2100, a host processor 100, a voice trigger system 200, an audio subsystem 300 and a sensor hub 400. The audio subsystem 300 and the sensor hub 400 may be included in the audio processing system 250 in FIG. 2A. According to example embodiments, the application processor 2000 may further include an active power manager APM, mail box modules MBXa, MBXb and MBXc, and an interrupt controller ITRC.

The system bus 2100 may be referred to as an interconnect device or a backbone. The system bus 2100 may include a higher-layer bus, a lower-layer bus and a bridge connecting them. For example, the system bus 2100 may include various buses such as an advanced extensible interface (AXI), an advanced high-performance bus (AHB), an advanced peripheral bus (APB), etc. and at least one bridge connecting the advanced extensible interface (AXI), the advanced high-performance bus (AHB), the advanced peripheral bus (APB), etc. The host processor 100 may access external devices such as a memory device 1200 and/or a storage device 1300 through the system bus 2100. In addition, the host processor 100 may communicate with the voice trigger system 200, the audio subsystem 300 and the sensor hub 400 through the system bus 2100.

Although one interrupt controller ITRC is illustrated in FIG. 3 for convenience of illustration, the interrupt controller ITRC may include at least one general interrupt controller (GIC), at least one vectored interrupt controller (VIC), etc. For example, the interrupt controller ITRC may be implemented as a programmable interrupt controller (PIC). The programmable interrupt controller may be implemented with multiple layers having a priority system represented by vectors. The programmable interrupt controller may receive an interrupt signal from peripheral devices, determine priorities of the received interrupt signal and issue an interrupt signal with a pointer address to a processor or a controller.

The active power manager APM may manage power of the application processor 2000. The active power manager APM may manage power supplied to respective regions or function blocks of the application processor 2000. The mail box modules MBXa, MBXb and MBXc may support a synchronization of data communication between the elements in the application processor 2000 or data communication between the application processor 2000 and external devices. The mail box modules MBXa, MBXb and MBXc will be described below with reference to FIG. 6.

Although FIG. 3 illustrates an example where the voice trigger system 200 and the audio subsystem 300 are connected to each other through one mail box module MBXc, and the voice trigger system 200 and the sensor hub 400 are connected to each other through one active power manager APM and two mail box modules MBXa and MBXb, the inventive concept is not limited thereto. For example, the voice trigger system 200 and the audio subsystem 300 may be connected to each other through one active power manager and two mail box modules, and/or the voice trigger system 200 and the sensor hub 400 may be connected to each other through one mail box module.

The voice trigger system 200 is electrically connected to the system bus 2100. The voice trigger system 200 performs a voice trigger operation and issues a trigger event based on a trigger input signal that is provided through a trigger interface. In some example embodiments, the voice trigger system 200 may receive the trigger input signal from a digital microphone DMIC 40 and/or an audio codec (coder and decoder) CODEC 50. In other words, the trigger interface of the voice trigger system 200 may be connected directly to the digital microphone 40 and the audio codec 50. The audio codec 50 may perform encoding and decoding (or analog-to-digital conversion (ADC) and digital-to-analog conversion (DAC)) of an audio signal received from the digital microphone 40 and/or an analog microphone AMIC 61, and an audio signal output to a speaker 62. The digital microphone 40 may be an on-board microphone that is mounted with the application processor 2000 on a board of the electronic device. The analog microphone 61 and the speaker 62 may be devices attached and detachable from terminals of the audio codec 50.

The audio subsystem 300 is electrically connected to the system bus 2100. The audio subsystem 300 processes audio streams that are replayed or recorded through an audio interface and supports transfer of the audio streams between the memory device 1200 and the audio interface. In some example embodiments, the audio subsystem 300 may exchange the audio streams with the audio codec 50 and/or a Bluetooth module BTM 70. In other words, the audio interface of the audio subsystem 300 may be connected directly to the audio codec 50 and the Bluetooth module 70. The Bluetooth module 70 may be connected to a Bluetooth microphone BMIC 81 and a Bluetooth speaker 82 through a Bluetooth audio module BTAUD 80 to receive the audio signal from the Bluetooth microphone 81 and output the audio signal to the Bluetooth speaker 82. The Bluetooth module 70 may be connected directly to another Bluetooth speaker 85 or another Bluetooth device. Although not illustrated in FIG. 3, the audio subsystem 300 may be connected to a universal serial bus (USB) module to exchange the audio stream with the USB module.

The sensor hub 400 is electrically connected to the system bus. The sensor hub 400 processes signals provided from one or more sensors SEN1 31 and SEN2 32. The sensor hub 400 may measure physical quantities associated with the electronic device and process the physical quantities to detect an operation status of the electronic device and process the detected operation status. For example, the sensors 31 and 32 may include a motion sensor, a gyro sensor, an atmospheric pressure sensor, a magnetic sensor, an accelerometer, a grip sensor, a proximity sensor, a biometric sensor, a temperature/humidity sensor, an illumination sensor, and an ultra violet (UV) sensor, an electrical-nose (E-nose) sensor, an electromyography (EMG) sensor, an electroencephalogram (EEG) sensor, an electrocardiogram (ECG) sensor, an infrared (IR) sensor, an iris sensor, and/or a finger print sensor.

In some example embodiments, as illustrated in FIG. 3, all of the system bus 2100, the voice trigger system 200, the audio subsystem 300 and the sensor hub 400 may be integrated in a single semiconductor chip forming the application processor 2000. In other example embodiments, the system bus 2100, the voice trigger system 200 and the audio subsystem 300 may be integrated in a single chip and the sensor hub 400 may be disposed external to the application processor 2000. However, in either case, the voice trigger system 200 is provided on the application processor 2000 and thus, the application processor, the electronic device including the application processor and the method of operating the application processor according to example embodiments may perform the voice trigger operation with low power and high efficiency by integrating the voice trigger system in the application processor.

Figure 4:
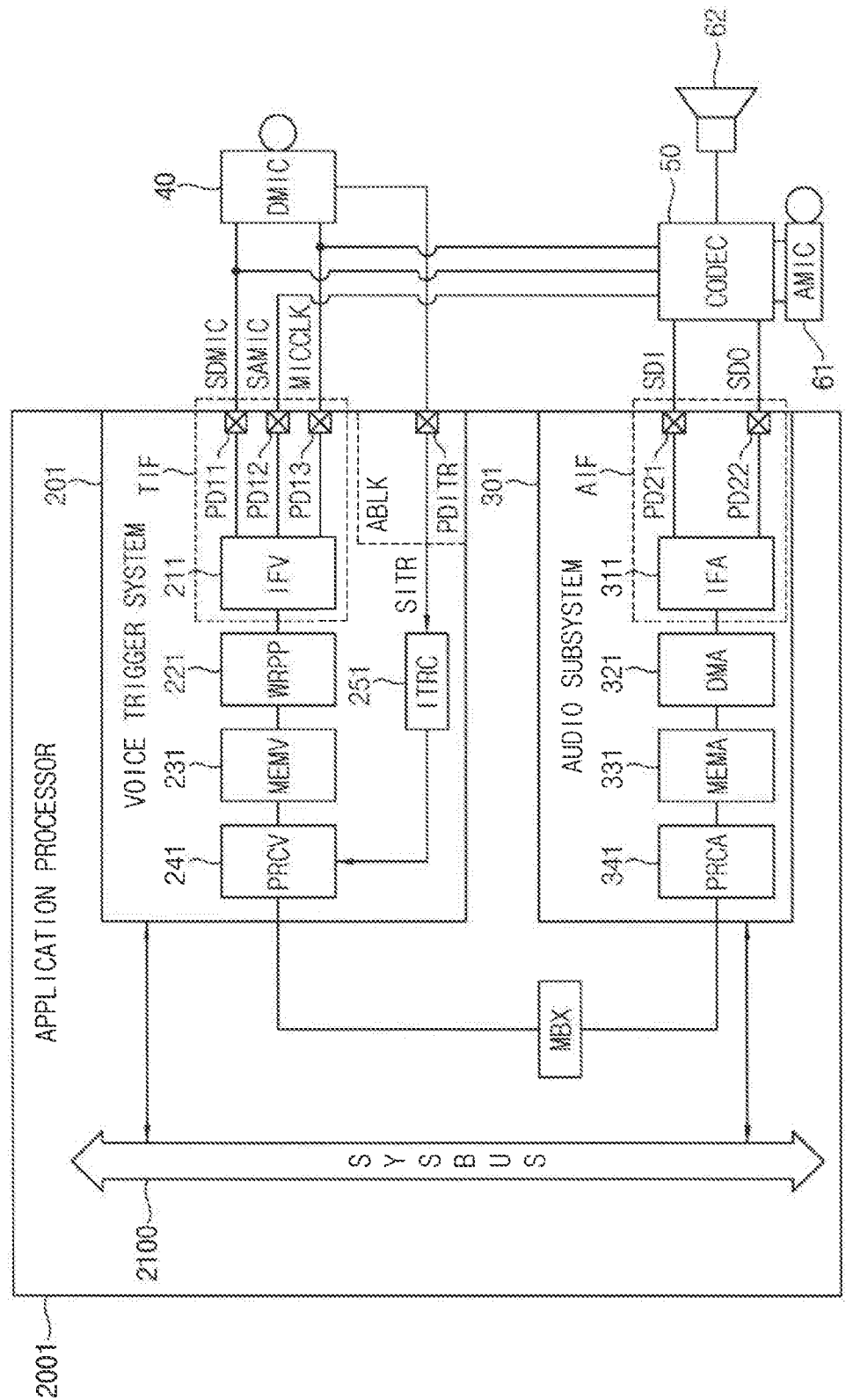
FIG. 4 is a block diagram illustrating an example connection of a voice trigger system and an audio subsystem in an application processor according to example embodiments.

FIG. 4 is a block diagram illustrating an example connection of a voice trigger system and an audio subsystem in an application processor according to example embodiments. The host processor 100 and other elements of FIG. 3 are present but are omitted in FIG. 4 for convenience of illustration.

Referring to FIG. 4, an application processor 2001 may include a system bus SYSBUS 2100, a voice trigger system 201, an interrupt pad PDITR, an audio subsystem 301 and a mail box module MBX. The audio subsystem 301 may be included in the audio processing system 250 in FIG. 2A.

The voice trigger system 201 is electrically connected to the system bus 2100. The voice trigger system 201 performs a voice trigger operation based on a mic trigger input signal SDMIC and/or a codec trigger input signal SAMIC that are provided through a trigger interface TIF. The voice trigger system 201 may receive the mic trigger input signal SDMIC from a digital microphone DMIC 40 and/or the codec trigger input signal SAMIC from an audio codec (coder and decoder) CODEC 50. A microphone clock signal MICCLK may be transferred between the voice trigger system 201, the digital microphone 40 and the audio codec 50 for a synchronization of a signal transfer. The mic and codec trigger input signals SDMIC and SAMIC and the microphone clock signal MICCLK may be transferred through pads PD11, PD12 and PD13, respectively, of the application processor 2001. The pads PD11, PD12 and PD13 may be implemented such that the used pad may be prevented from being interfered with the other unused pads.

The interrupt pad PDITR receives an interrupt signal SITR. The interrupt pad PDITR may be separated from and formed independently of the pads PD11, PD12 and PD13. For example, the interrupt signal SITR may be received from the digital microphone 40 as illustrated in FIG. 4, or from a Bluetooth module, a USB module or any sensor as will be described with reference to FIGS. 8, 9 and 10.

The interrupt signal SITR includes a first interrupt signal and a second interrupt signal. The interrupt pad PDITR receives the first interrupt signal when the operating environment is changed from the low noise environment to the noisy environment and receives the second interrupt signal when the operating environment is changed from the noisy environment to the low noise environment. When the first interrupt signal is received, at least a part of the voice trigger system 201 is changed from the idle state to the normal state to perform the voice trigger operation. When the second interrupt signal is received, the at least a part of the voice trigger system 201 may be changed from the normal state to the idle state to stop the voice trigger operation and to reduce power consumption.

The voice trigger system 201 may include a trigger interface circuit IFV 211, a wrapper WRPP 221, a trigger memory MEMV 231, a trigger processor PRCV 241, an interrupt controller ITRC 251 and an alive block ABLK.

The trigger interface circuit 211 and the pads PD11, PD12 and PD13 may form the trigger interface TIF to sample and convert the mic trigger input signal SDMIC provided from the digital microphone 40 and/or the codec trigger input signal SAMIC provided from the audio codec 50. The wrapper 221 may store data provided from trigger interface circuit 211 in the trigger memory 231. The wrapper 221 may issue an interrupt signal to the trigger processor 241 when a threshold amount of data is stored in the trigger memory 231 so that the trigger processor 241 may perform the voice trigger operation based on data stored in the trigger memory 231.

In some example embodiments, the voice trigger system 201 may receive a pulse density modulation (PDM) signal as the mic and codec trigger input signals SDMIC and SAMIC. The trigger interface circuit 211 may convert the PDM signal to pulse code modulation (PCM) data. The wrapper 221 may store the PCM data in the trigger memory 231. The wrapper 221 may be implemented with a direct memory access controller.

The alive block ABLK may always maintain an active state regardless of the active mode and the sleep mode of the system bus 2100 and the host processor 100. In other words, the alive block ABLK may be always enabled independently of the enablement and disablement of the system bus 2100 and the host processor 100. The interrupt pad PDITR may be disposed or located in the alive block ABLK. In other words, in an example of FIG. 4, the alive block ABLK and the interrupt pad PDITR may be disposed or located in the voice trigger system 201.

The interrupt controller ITRC 251 may provide the interrupt signal SITR to the trigger processor 241. The trigger processor 241 may enter or wake up into the normal state based on the first interrupt signal and enter the idle state based on the second interrupt signal. In other words, the trigger processor 241 may be enabled and disabled based on the first interrupt signal and the second interrupt signal, respectively. As will be described with reference to FIG. 5, some elements other than the trigger processor 241 in the voice trigger system 201 may further enter the idle state based on the second interrupt signal.

The audio subsystem 301 is electrically connected to the system bus 2100. The audio subsystem 301 processes audio streams that are replayed or recorded through an audio interface AIF and supports transfer of the audio streams between the memory device 1200 and the audio interface. In some example embodiments, the audio subsystem 301 may exchange the audio streams with the audio codec 50. The audio subsystem 301 may receive an audio input signal SDI through an audio input pad PD21 from the audio codec 50 and transmit an audio output signal SDO through an audio output pad PD22 to the audio codec 50.

The audio subsystem 301 may include an audio interface circuit IFA 311, a direct memory access controller DMA 321, an audio memory MEMA 331 and an audio processor PRCA 341.

The audio interface circuit 311 and the audio input and output pads PD21 and PD22 may form the audio interface AIF to transfer the audio streams through the audio input signal SDI and the audio output signal SDO. The audio memory 331 may store data of the audio streams, and the direct memory access controller 321 may control access to the audio memory, that is, data read from the audio memory 331 and data write to the audio memory 331. The audio processor 341 may process data stored in the audio memory 331.

In some example embodiments, the audio interface circuit AIF 311 may be compatible with I2S (Inter-IC Sound) or IIS (Integrated Interchip Sound) standard. Although not illustrated in FIG. 4, the audio interface circuit 311 may operate based on clock signals according to the I2S standard. In some example embodiments, the audio interface circuit 311 may be connected directly to the digital microphone 40 and/or the audio codec 50.

Figure 5:
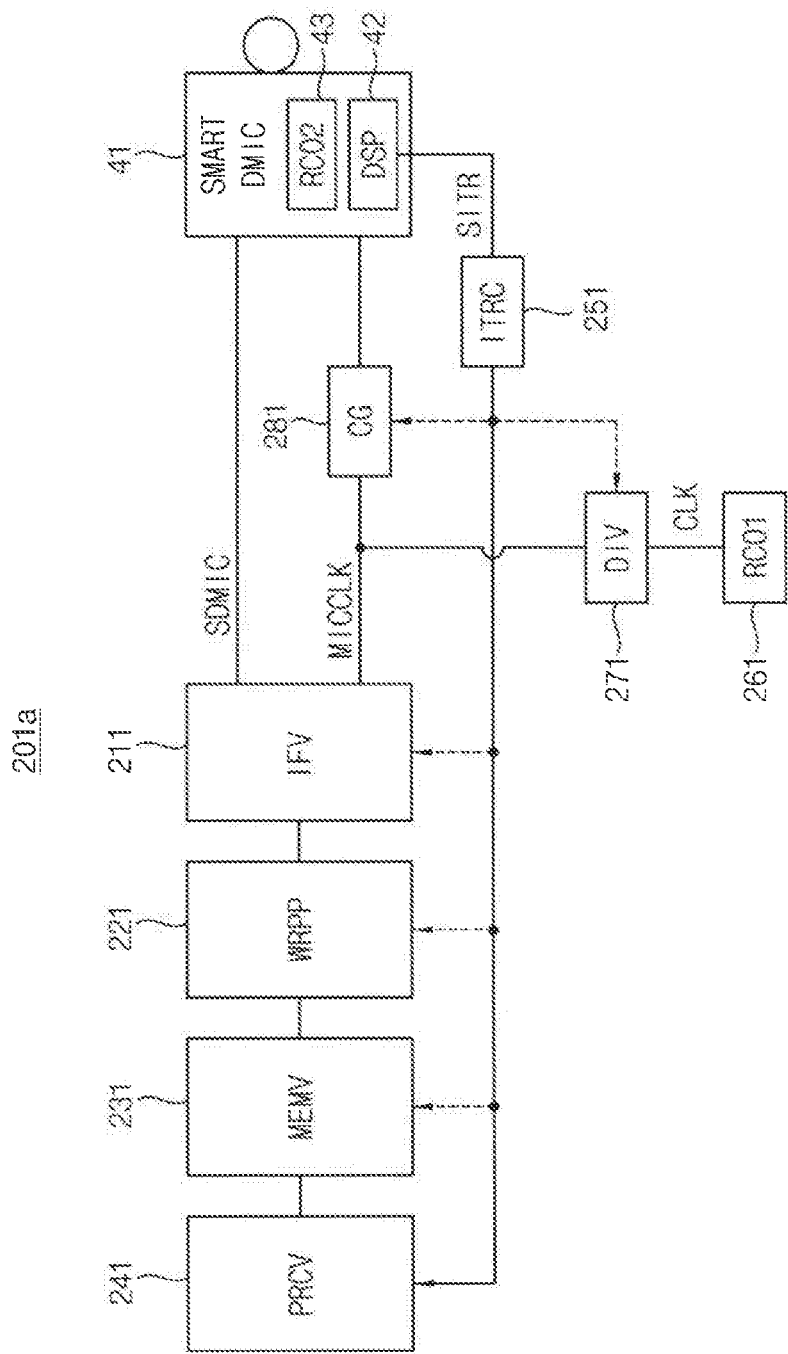
FIG. 5 is a block diagram illustrating an example embodiment of a voice trigger system included in the application processor of FIG. 4.

FIG. 5 is a block diagram illustrating an example embodiment of a voice trigger system included in the application processor of FIG. 4. The descriptions repeated with FIG. 4 may be omitted.

Referring to FIG. 5, a voice trigger system 201a may include a trigger interface circuit 211, a wrapper 221, a trigger memory 231, a trigger processor 241 and an interrupt controller 251. The voice trigger system 201a may further include a first RC oscillator RCO1 261, a clock divider DIV 271 and a clock gating circuit CG 281. The pads PD11, PD12, PD13 and PDITR and the alive block ABLK of FIG. 4 are present but are omitted in FIG. 5 for convenience of illustration.

The first RC oscillator 261 may generate a clock signal CLK. For example, the first RC oscillator 261 may be included in the alive block ABLK located inside or outside the voice trigger system 201a. The clock divider 271 may divide the clock signal CLK from the first RC oscillator 261 to provide the microphone clock signal MICCLK to the trigger interface TIF. The microphone clock signal MICCLK may be transferred to the trigger interface circuit 211 and a digital microphone 41 and used to drive or operate the trigger interface circuit 211 and the digital microphone 41.

In some example embodiments, the digital microphone 41 may be a smart digital microphone. For example, the digital microphone 41 may include a digital signal processor DSP 42 and a second RC oscillator RCO2 43. As with the digital microphone 40 in FIG. 4, the voice trigger system 201a may receive a mic trigger input signal SDMIC from the digital microphone 41. In addition, the digital signal processor 42 may detect the noisy environment to generate the first interrupt signal and detect the low noise environment to generate the second interrupt signal.

In some example embodiments, the interrupt controller 251 may transfer the interrupt signal SITR received from the interrupt pad PDITR to the trigger processor 241 and further to at least one of the trigger interface circuit 211, the wrapper 221 and the trigger memory 231. The trigger processor 241 may be changed from the idle state to the normal state based on the first interrupt signal. In addition, the trigger processor 241 may be changed from the normal state to the idle state based on the second interrupt signal, and at least one of the trigger interface circuit 211, the wrapper 221 and the trigger memory 231 may be further changed from the normal state to the idle state based on the second interrupt signal. When the trigger memory 231 is changed from the normal state to the idle state, at least a part of the trigger memory 231 may maintain previous information stored during the normal state even if the trigger memory 231 is changed from the normal state to the idle state.

In some example embodiments, the interrupt controller 251 may further transfer the interrupt signal SITR to at least one of the clock divider 271 and the clock gating circuit 281. When the second interrupt signal is transferred to the clock divider 271, the clock divider 271 may further divide the clock signal CLK from the first RC oscillator 261 and provide the divided clock signal having a frequency lower than that of the normal microphone clock signal MICCLK to the trigger interface circuit 211, thereby reducing dynamic power. When the second interrupt signal is transferred to the clock gating circuit 281, the clock gating circuit 281 may block the microphone clock signal MICCLK transferred to the digital microphone 41 (e.g., a generation of the microphone clock signal MICCLK may be stopped), and the microphone clock signal MICCLK may not be output external to the voice trigger system 201a, thereby reducing pad toggling power.

In some example embodiments, when the clock gating circuit 281 is enabled based on the second interrupt signal and the output of the microphone clock signal MICCLK to the digital microphone 41 is blocked, the second RC oscillator 43 in the digital microphone 41 may generate a second microphone clock signal that is substantially the same as the microphone clock signal MICCLK, and the digital microphone 41 may operate based on the second microphone clock signal. The second RC oscillator 43 may be referred to as an internal or embedded RC oscillator.

In some example embodiments, after the second interrupt signal is generated, the digital signal processor 42 may detect the noisy environment (or a wake-up environment) to generate the first interrupt signal again. The interrupt pad PDITR may receive the first interrupt signal, and at least a part of the voice trigger system 201a in the idle state may be enabled when the first interrupt signal is received.

Figure 6:
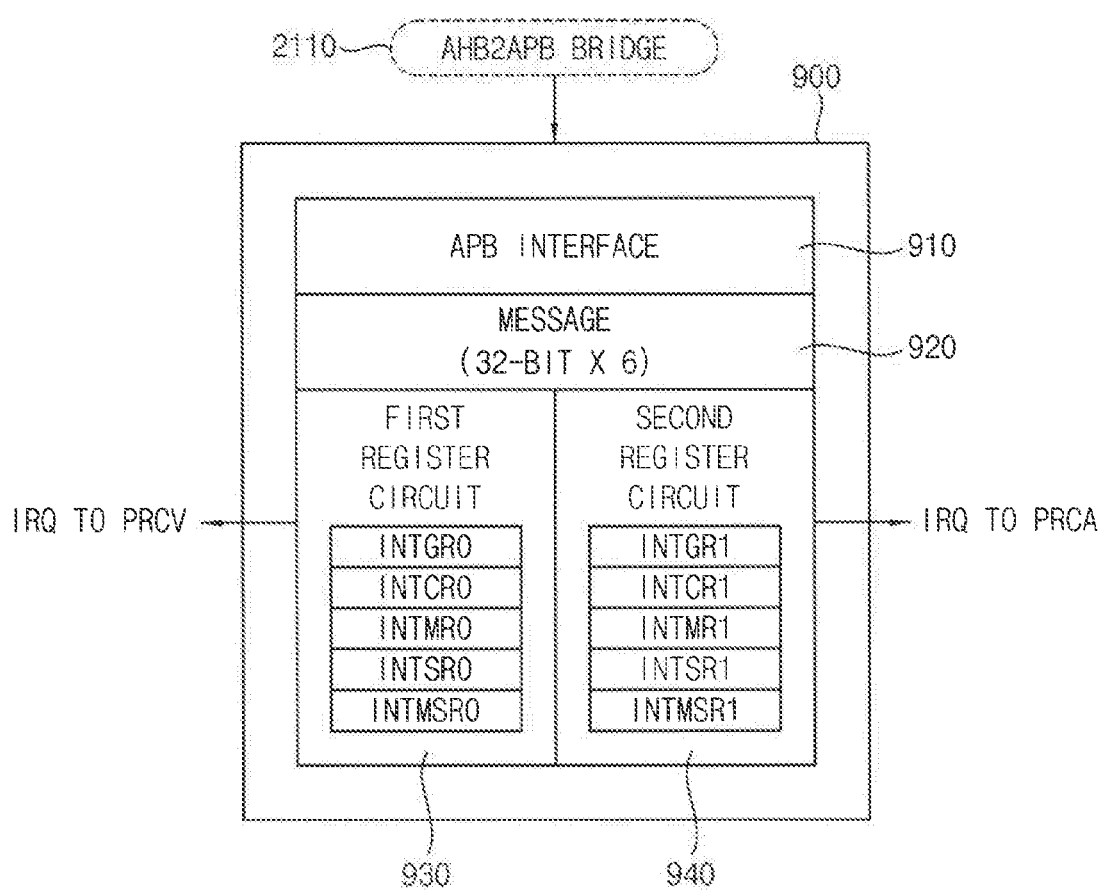
FIG. 6 is a diagram illustrating an example embodiment of a mail box module included in the application processor of FIG. 4.

FIG. 6 is a diagram illustrating an example embodiment of a mail box module included in the application processor of FIG. 4.

Referring to FIGS. 4 and 6, the mail box module MBX included in the application processor 2001 may support a synchronization of a data transmission or a data communication between the voice trigger system 201 and the audio subsystem 301. The application processor 2001 may perform the data communication between the voice trigger system 201 and the audio subsystem 301 through the mail box module MBX independently of the system bus 2100.

As illustrated in FIG. 6, a mail box module 900 may include an interface APB INTERFACE 910, a message box MESSAGE 920, a first register circuit 930 including a plurality of registers INTGR0, INTCR0, INTMR0, INTSR0 and INTMSR0, and a second register circuit 940 including a plurality of registers INTGR1, INTCR1, INTMR1, INTSR1 and INTMSR1. FIG. 6 illustrates a non-limiting example that the mail box module 900 is connected to an AHB2APB bridge of the system bus 2100 through an APB interface and the message box 920 is implemented with shared registers of 6*32 bits. However, this is only an example and the type of the interface 910, and the number and the bit number of the registers in the message box 920 may be determined variously. The first register circuit 930 may generate an interrupt signal (IRQ TO PRCV) provided to the trigger processor 241 in the voice trigger system 201 and the second register circuit 940 may generate an interrupt signal (IRQ TO PRCA) provided to the audio processor 341 in the audio subsystem 301. The data transmission between the voice trigger system 201 and the audio subsystem 301 may be synchronized using the mail box module 900.

The mail box module 900 may perform bilateral communication by transmitting an interrupt signal after one of the trigger processor 241 and the audio processor 341 writes a message in the message box 920. The synchronization of the data transmission between the voice trigger system 201 and the audio subsystem 301 may be implemented through a polling method, etc.

In some example embodiments, the audio subsystem 301 may use at least a portion of the trigger memory 231 in the voice trigger system 201 as a cache memory while the voice trigger system 201 does not perform the voice trigger operation.

Figure 7:
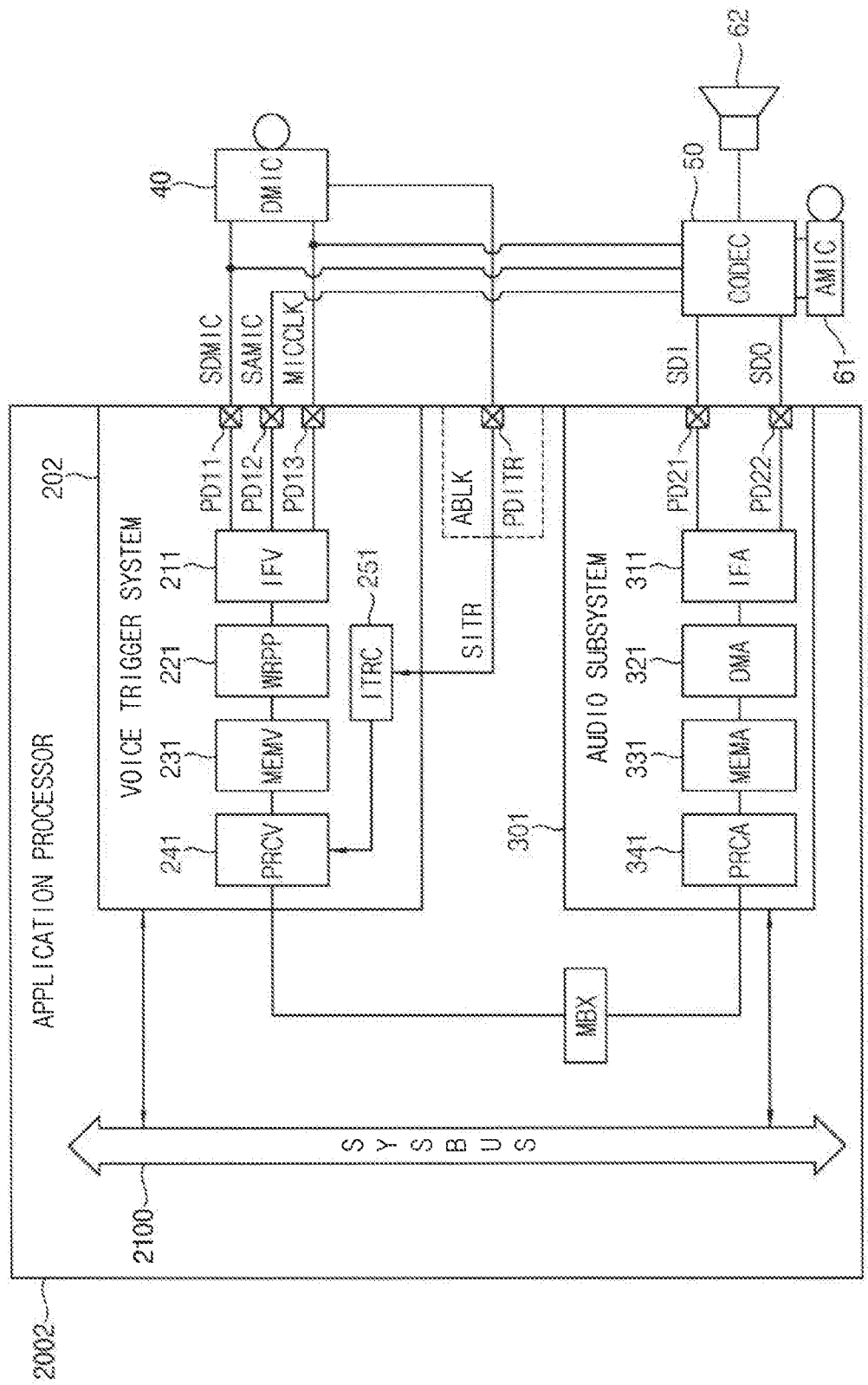
FIGS. 7, 8 and 9 are block diagrams illustrating an example connection of a voice trigger system and an audio subsystem in an application processor according to example embodiments.
Figure 8:
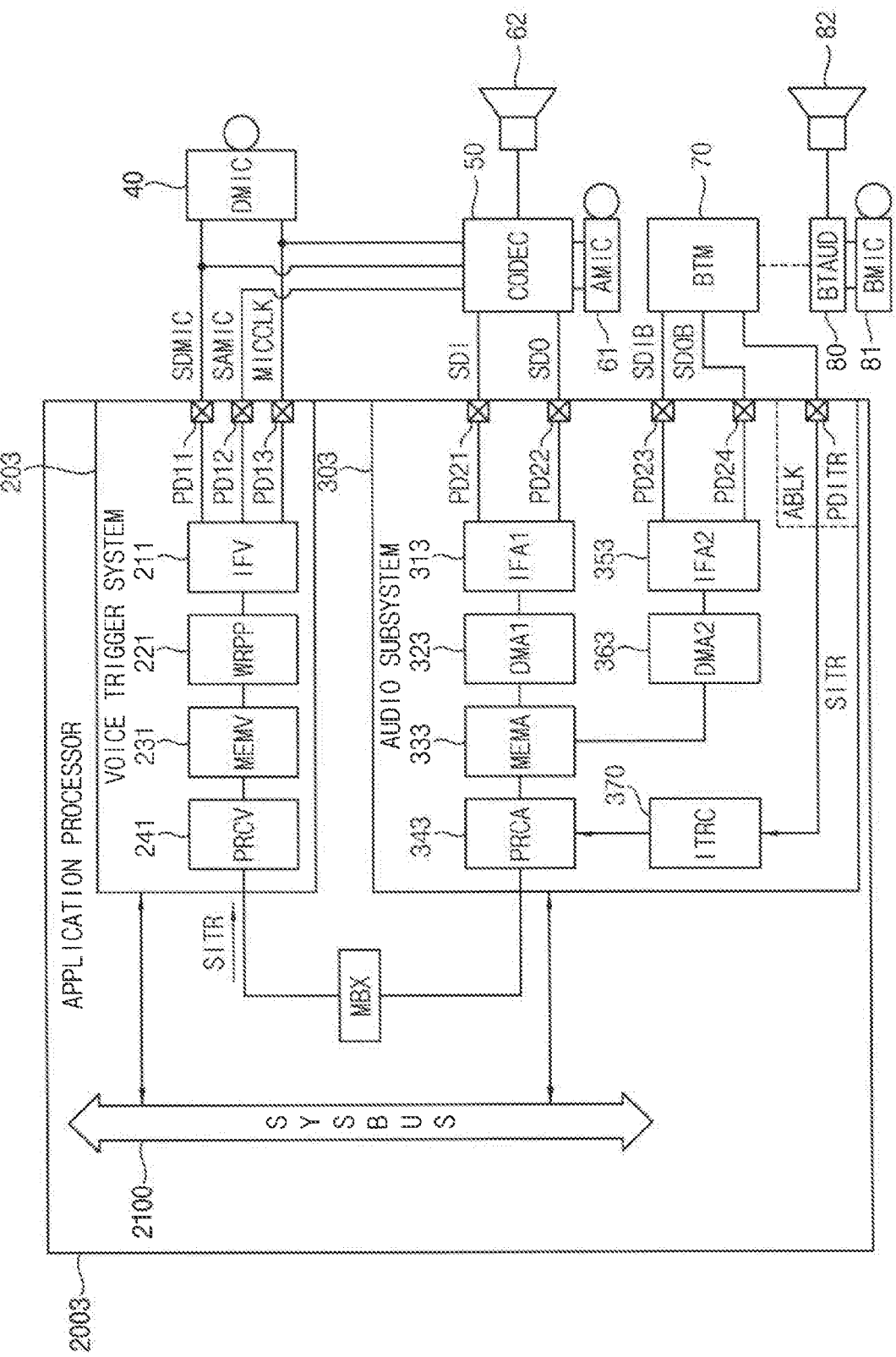
Figure 9:
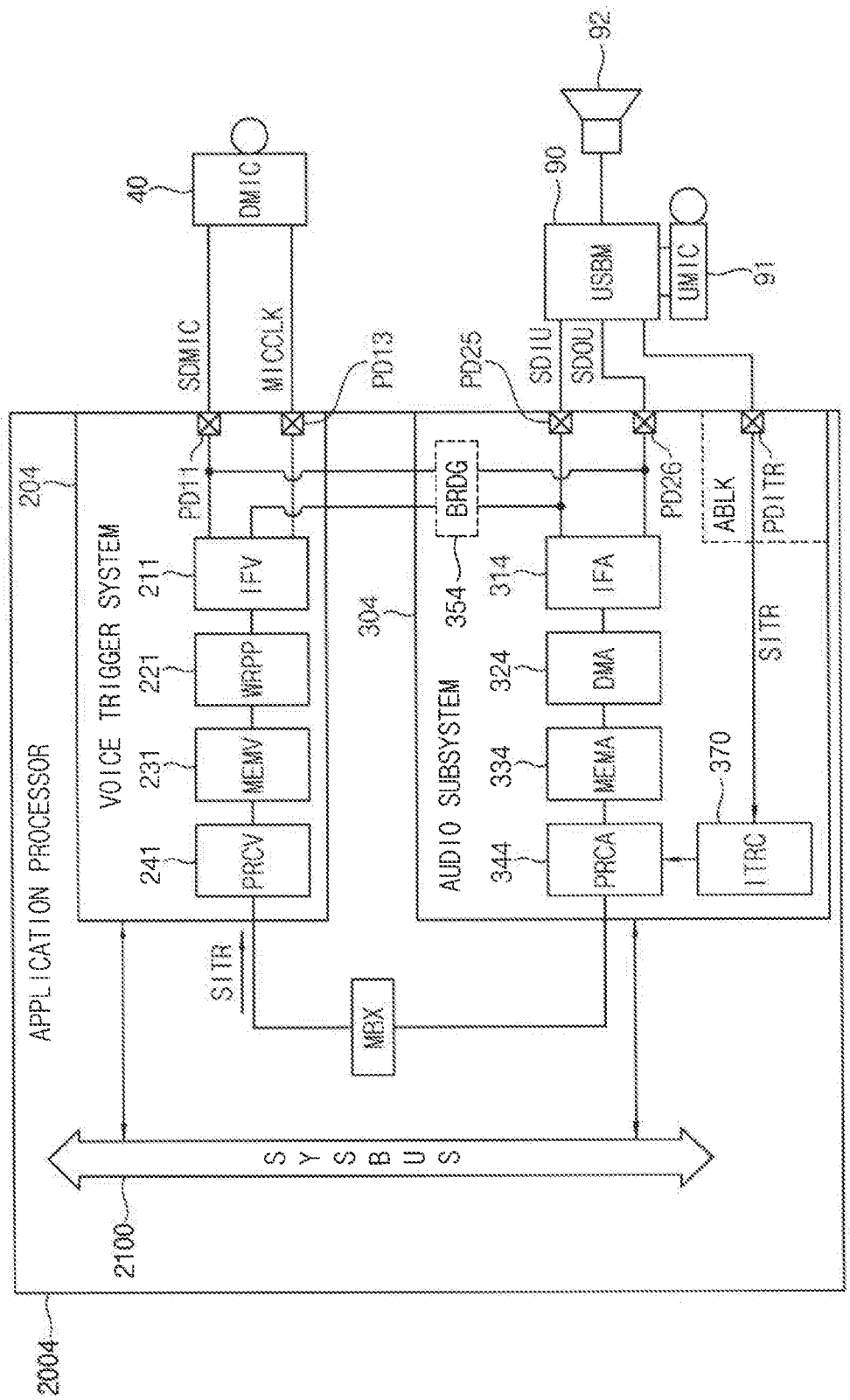

FIGS. 7, 8 and 9 are block diagrams illustrating an example connection of a voice trigger system and an audio subsystem in an application processor according to example embodiments. The descriptions repeated with FIG. 4 may be omitted.

Referring to FIG. 7, an application processor 2002 may include a system bus 2100, a voice trigger system 202, an alive block ABLK, an interrupt pad PDITR, an audio subsystem 301 and a mail box module MBX. The audio subsystem 301 may be included in the audio processing system 250 in FIG. 2A.

The application processor 2002 of FIG. 7 may be structurally and functionally substantially the same as the application processor 2001 of FIG. 4, except that the alive block ABLK and the interrupt pad PDITR included in the alive block ABLK are disposed external to the voice trigger system 202 of the application processor 2002. That is, the alive block ABLK and the interrupt pad PDITR included in the alive block ABLK are disposed external to both the voice trigger system 202 and the audio subsystem 301 of the application processor 2002.

In some example embodiments, the alive block ABLK may be any alive block included in the application processor 2002, and the interrupt pad PDITR may be a general purpose input-output (GPIO) pad included in the alive block ABLK.

Referring to FIG. 8, an application processor 2003 may include a system bus 2100, a voice trigger system 203, an interrupt pad PDITR, an audio subsystem 303 and a mail box module MBX. The audio subsystem 303 may be included in the audio processing system 250 in FIG. 2A.

The application processor 2003 of FIG. 8 may be structurally and functionally substantially the same as the application processor 2001 of FIG. 4, except that the audio subsystem 303 further includes a configuration for connecting a Bluetooth module 70, and an interrupt signal SITR is provided from the Bluetooth module 70 and an alive block ABLK and the interrupt pad PDITR are disposed in the audio subsystem 303.

The audio subsystem 303 is electrically connected to the system bus 2100. The audio subsystem 303 processes audio streams that are replayed or recorded through an audio interface and supports transfer of the audio streams between the memory device 1200 and the audio interface. In some example embodiments, the audio subsystem 303 may exchange the audio streams with an audio codec 50 and/or the Bluetooth module 70. The audio subsystem 303 may receive an audio input signal SDI through an audio input pad PD21 of the audio interface from the audio codec 50 and transmit an audio output signal SDO through an audio output pad PD22 of the audio interface to the audio codec 50. The audio subsystem 303 may receive an audio input signal SDIB through a Bluetooth input pad PD23 of the audio interface from the Bluetooth module 70 and transmit an audio output signal SDOB through a Bluetooth output pad PD24 of the audio interface to the Bluetooth module 70.

The audio subsystem 303 may include a first audio interface circuit IFA1 313, a first direct memory access controller DMA1 323, a first audio memory 333, an audio processor 343, a second audio interface circuit IFA2 353, a second direct memory access controller DMA2 363, an interrupt controller 370 and the alive block ABLK.

The interrupt pad PDITR may be disposed or located in the alive block ABLK. In other words, in an example of FIG. 8, the alive block ABLK and the interrupt pad PDITR may be disposed or located in the audio subsystem 303.

As with the digital microphones 40 and 41 in FIGS. 4 and 5, respectively, the Bluetooth module 70 may generate the first interrupt signal when the operating environment is changed from the low noise environment to the noisy environment and generate the second interrupt signal when the operating environment is changed from the noisy environment to the low noise environment. The interrupt pad PDITR may receive the interrupt signal SITR including the first interrupt signal and the second interrupt signal from the Bluetooth module 70. In other words, in an example of FIG. 8, the interrupt pad PDITR may be a Bluetooth interrupt pad.

The interrupt controller 370 may provide the interrupt signal SITR to the audio processor 343, and the audio processor 343 may provide the interrupt signal SITR through the mail box module MBX to the trigger processor 241. The trigger processor 241 may enter or wake up into the normal state based on the first interrupt signal and enter the idle state based on the second interrupt signal. In other words, an interrupt communication between the voice trigger system 203 and the audio subsystem 303 may be performed through the mail box module MBX independently of the system bus 2100.

Referring to FIG. 9, an application processor 2004 may include a system bus 2100, a voice trigger system 204, an interrupt pad PDITR, an audio subsystem 304 and a mail box module MBX. The audio subsystem 304 may be included in the audio processing system 250 in FIG. 2A.

The application processor 2004 of FIG. 9 may be structurally and functionally substantially the same as the application processor 2001 of FIG. 4, except that the audio subsystem 304 does not include a configuration for connecting the audio codec 50, the audio subsystem 303 further includes a configuration for connecting a USB module USBM 90, an interrupt signal SITR is provided from the USB module 90, and an alive block ABLK and the interrupt pad PDITR are disposed in the audio subsystem 304.

The audio subsystem 304 is electrically connected to the system bus 2100. The audio subsystem 304 processes audio streams that are replayed or recorded through an audio interface and supports transfer of the audio streams between the memory device 1200 and the audio interface. In some example embodiments, the audio subsystem 304 may exchange the audio streams with the USB module 90. The audio subsystem 304 may receive an audio input signal SDIU through a USB input pad PD25 of the audio interface from a USB microphone UMIC 91 and the USB module 90, and transmit an audio output signal SDOU through a USB output pad PD26 of the audio interface to the USB module 90 and a USB speaker 92.

The audio subsystem 304 may include an audio interface circuit 314, a direct memory access controller 324, an audio memory 334, an audio processor 344, an interrupt controller 370 and the alive block ABLK.

The interrupt pad PDITR may be disposed or located in the alive block ABLK. In other words, in an example of FIG. 9, the alive block ABLK and the interrupt pad PDITR may be disposed or located in the audio subsystem 304.

As with the digital microphones 40 and 41 in FIGS. 4 and 5, respectively, the USB module 90 may generate the first interrupt signal when the operating environment is changed from the low noise environment to the noisy environment and generate the second interrupt signal when the operating environment is changed from the noisy environment to the low noise environment. The interrupt pad PDITR may receive the interrupt signal SITR including the first interrupt signal and the second interrupt signal from the USB module 90. In other words, in an example of FIG. 9, the interrupt pad PDITR may be a USB interrupt pad.

The interrupt controller 370 may provide the interrupt signal SITR to the audio processor 344, and the audio processor 344 may provide the interrupt signal SITR through the mail box module MBX to the trigger processor 241. The trigger processor 241 may enter or wake up into the normal state based on the first interrupt signal and enter the idle state based on the second interrupt signal. In other words, an interrupt communication between the voice trigger system 204 and the audio subsystem 304 may be performed through the mail box module MBX independently of the system bus 2100.

In some example embodiments, the audio subsystem 304 may further include a bridge bus BRDG 354, and the voice trigger system 204 may receive the trigger input signal through the bridge bus 354 from the USB module 90. This configuration may omit providing the interrupt signal to the trigger processor 241 through the mail box module MBX.

Although not shown, the audio codec 50 may be included in the audio subsystem 301 in FIGS. 4 and 7, according to example embodiments. The audio codec 50 in FIG. 8 and related configuration may be omitted and the voice trigger system 203 in FIG. 8 may receive the trigger input signal from the Bluetooth module 70 in FIG. 8, according to example embodiments. The audio codec and related configuration may be added in FIG. 9 and the voice trigger system 204 in FIG. 9 may receive the trigger input signal from the audio codec, according to example embodiments.

Figure 10:
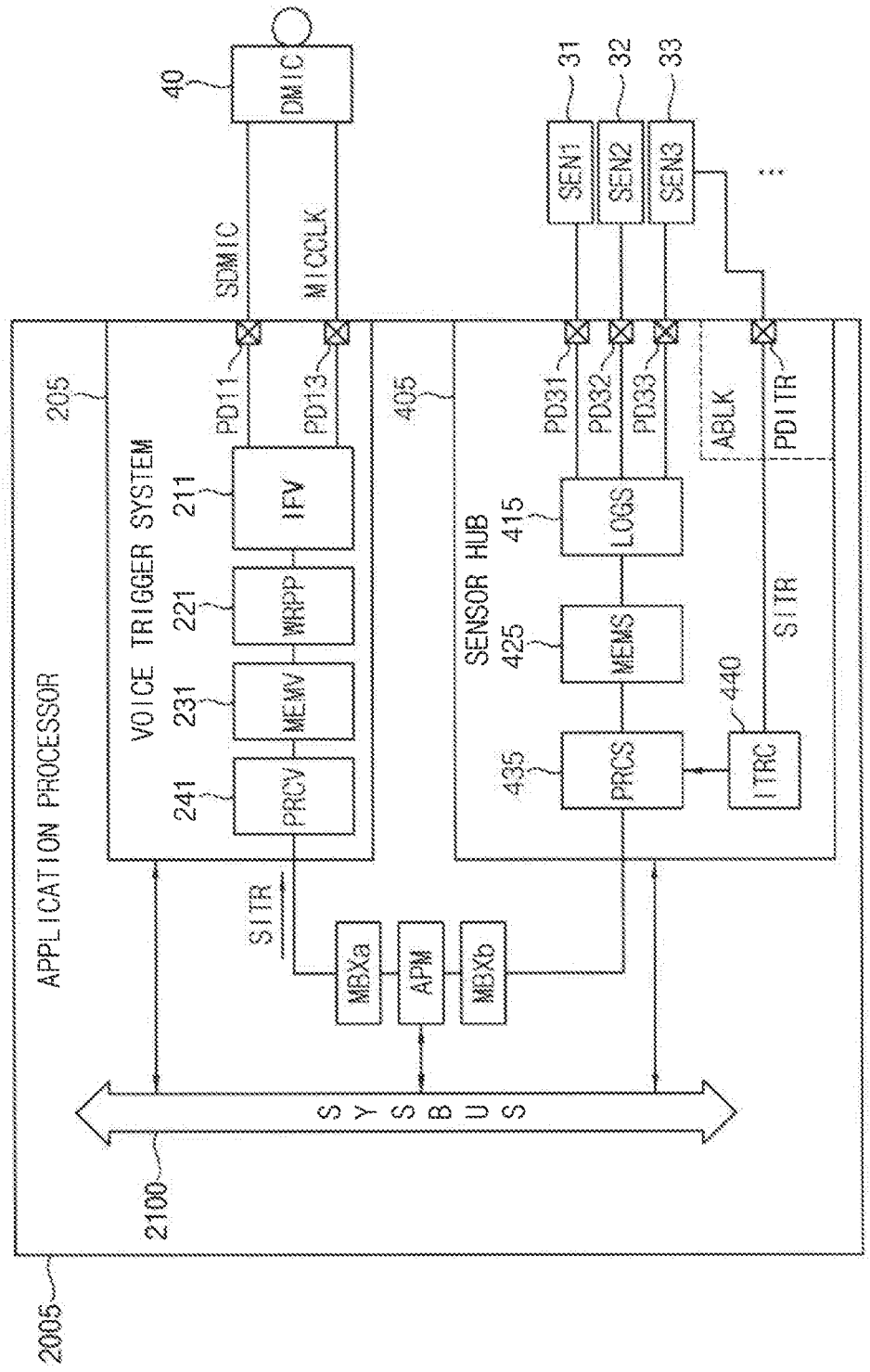
FIG. 10 is a block diagram illustrating an example connection of a voice trigger system and a sensor hub in an application processor according to example embodiments.

FIG. 10 is a block diagram illustrating an example connection of a voice trigger system and a sensor hub in an application processor according to example embodiments. The host processor 100 and other elements of FIG. 3 are present but are omitted in FIG. 10 for convenience of illustration.

Referring to FIG. 10, an application processor 2005 may include a system bus 2100, a voice trigger system 205, a sensor hub 405, an active power manager APM and mail box modules MBXa and MBXb. The sensor hub 405 may be included in the audio processing system 250 in FIG. 2A.

The voice trigger system 205 is electrically connected to the system bus 2100. The voice trigger system 205 performs a voice trigger operation based on a trigger input signal SDMIC that is provided through a trigger interface. The voice trigger system 205 may receive the trigger input signal SDMIC from a digital microphone 40. A microphone clock signal MICCLK may be transferred between the voice trigger system 205 and the digital microphone 40 for a synchronization of a signal transfer.

The sensor hub 405 is electrically connected to the system bus 2100 to process signals provided from one or more sensors SEN1 31, SEN2 32 and SEN3 33.

The sensor hub 405 may include a sensor logic LOGS 415, a sensor memory MEMS 425 and a sensor processor PRCS 435 to process the signals provided from the various sensors as described with reference to FIG. 3. The sensor hub 405 may further include an interrupt controller 440 and an alive block ABLK.

The interrupt pad PDITR may be disposed or located in the alive block ABLK. In other words, in an example of FIG. 10, the alive block ABLK and the interrupt pad PDITR may be disposed or located in the sensor hub 405.

As with the digital microphones 40 and 41 in FIGS. 4 and 5, respectively, at least one sensor (e.g., the sensor 31) may generate the first interrupt signal when the operating environment is changed from the low noise environment to the noisy environment and generate the second interrupt signal when the operating environment is changed from the noisy environment to the low noise environment. The interrupt pad PDITR may receive the interrupt signal SITR including the first interrupt signal and the second interrupt signal from the sensor 31. In other words, in an example of FIG. 10, the interrupt pad PDITR may be a sensor interrupt pad.

The interrupt controller 440 may provide the interrupt signal SITR to the sensor processor 435, and the audio processor 343 may provide the interrupt signal SITR through the mail box modules MBXa and MBXb and the active power manager APM to the trigger processor 241. The trigger processor 241 may enter or wake up into the normal state based on the first interrupt signal and enter the idle state based on the second interrupt signal. In other words, an interrupt communication between the voice trigger system 205 and the sensor hub 405 may be performed through the mail box modules MBXa and MBXb and the active power manager APM independently of the system bus 2100.

In some example embodiments, as illustrated in FIG. 10, two mail box modules MBXa and MBXb may perform the synchronization of the data communication between the voice trigger system 205 and the sensor hub 405 via the active power manager APM. Each of the mail box modules MBXa and MBXb may be the same as described with reference to FIG. 6. In other example embodiments, one mail box module may perform the synchronization between the voice trigger system 205 and the sensor hub 405 without the active power manager APM.

Although not shown, the audio codec and related configuration may be added in FIG. 10 and the voice trigger system 205 in FIG. 10 may receive the trigger input signal from the audio codec, according to example embodiments. The alive block ABLK and the interrupt pad PDITR in the alive block ABLK may be disposed external to the audio subsystem 303 in FIG. 8, the audio subsystem 304 in FIG. 9, or the sensor hub 405 in FIG. 10, according to example embodiments. That is, similar to the example embodiment shown in FIG. 7, the alive block ABLK and the interrupt pad PDITR in the alive block ABLK may be configured as shown in FIGS. 8-10, but may be disposed external to the audio subsystem 303 in FIG. 8, the audio subsystem 304 in FIG. 9, or the sensor hub 405 in FIG. 10.

Figure 11A:
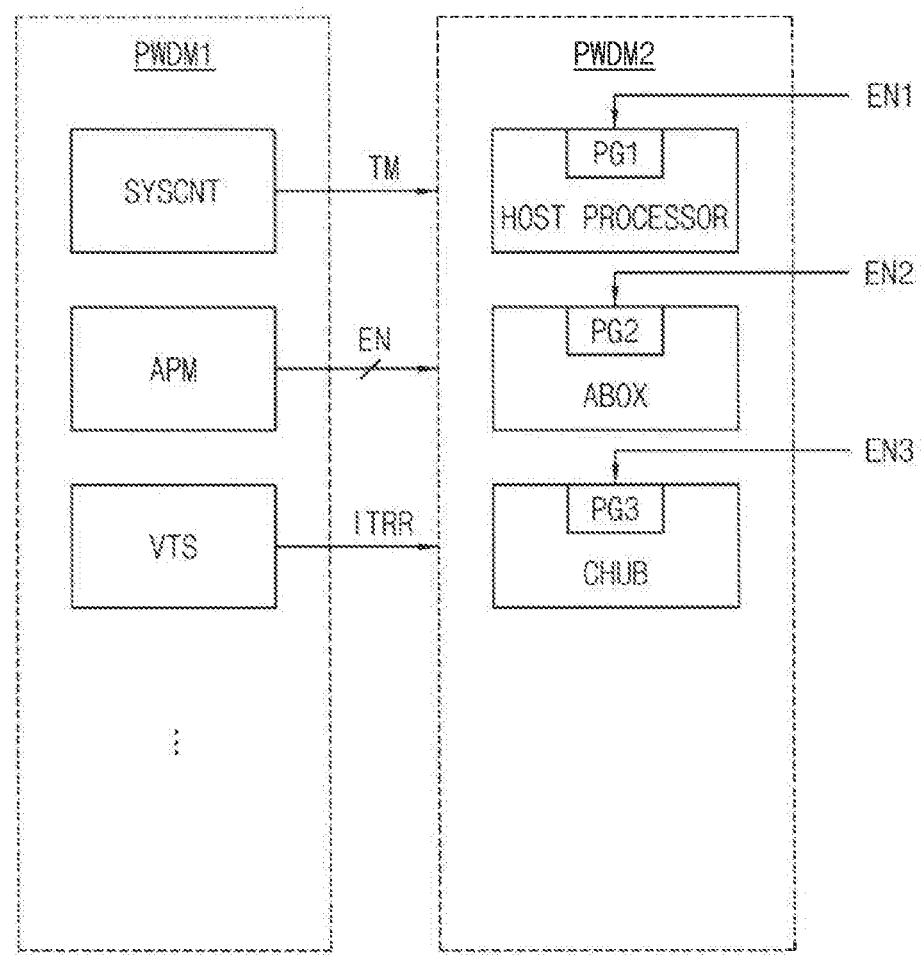
FIGS. 11A and 11B are diagrams for describing power domains of an application processor according to example embodiments.
Figure 11B:
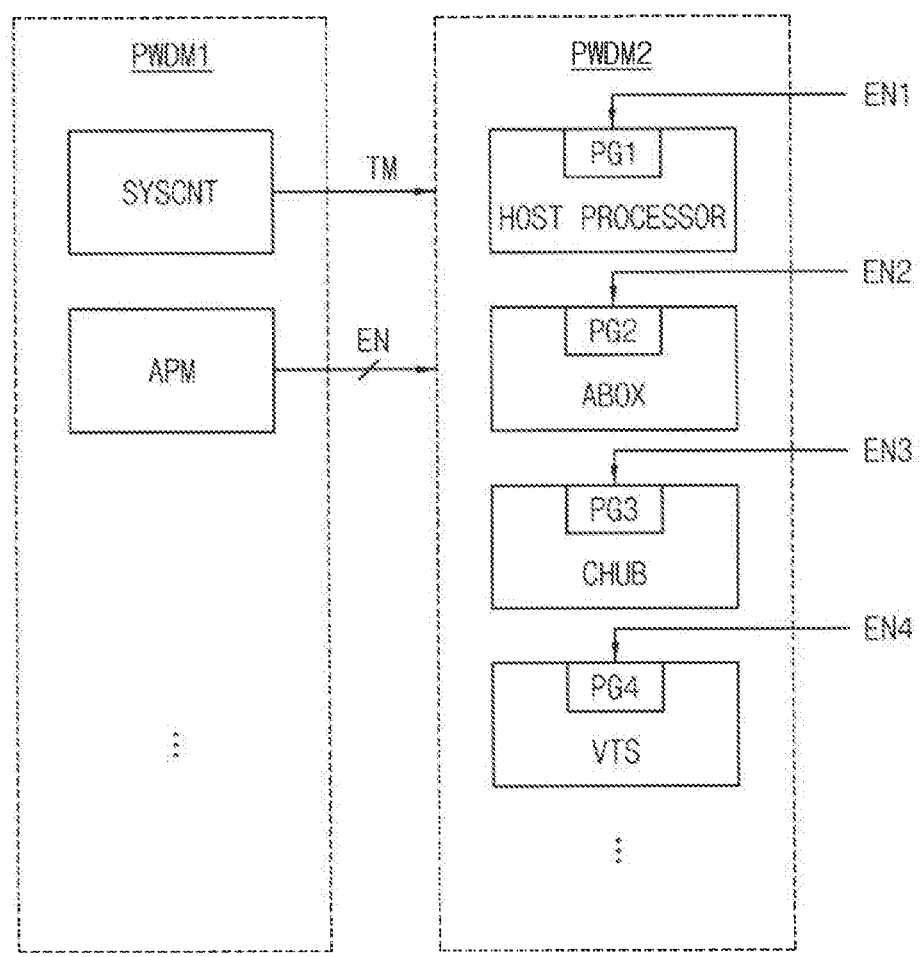

FIGS. 11A and 11B are diagrams for describing power domains of an application processor according to example embodiments.

An application processor may include a plurality of power domains that are independently powered. FIGS. 11A and 11B illustrate a first power domain PWDM1 and a second power domain PWDM2 as an example. The first power domain PWDM1 corresponds to an always-powered domain where power is supplied in both of an active mode and a standby mode (or a sleep mode), and the second power domain PWDM2 corresponds to a power-save domain where power is blocked in the standby mode.

Referring to FIG. 11A, a system counter SYSCNT, an active power manager APM and a voice trigger system VTS may be disposed in the always-powered domain PWDM1. A plurality of hardware blocks such as a host processor CPU, an audio subsystem ABOX, a sensor hub CHUB, etc. may be disposed in the power-save domain PWDM2.

The system counter SYSCNT may generate time information TM and provide the time information TM to internal circuits of the system. The active power manager APM may generate a plurality of power enable signals EN to control power supply, power block, etc. of various elements in the system. The voice trigger system VTS may generate an interrupt signal ITRR representing the trigger event.

In this disclosure, the active mode represents that at least the host processor CPU is enabled and an operating system (OS) runs. The sleep mode or the standby mode represents a power-down mode that the host processor CPU is disabled.

In comparison with the disposition of FIG. 11A, the voice trigger system VTS may be disposed in the power-save domain PWDM2, depending on the configuration of the alive block ABLK, as illustrated in FIG. 11B.

As illustrated in FIGS. 11A and 11B, the host processor CPU, the voice trigger system VTS, the audio subsystem ABOX and the sensor hub CHUB may include power gating circuits PG1, PG2, PG3 and PG4, respectively. The power gating circuits PG1~PG4 may supply power selectively in response to power enable signals EN1, EN2, EN3 and EN4. As such, the voice trigger system VTS, the audio subsystem ABOX and the sensor hub CHUB may be power-gated and enabled independently of the host processor CPU. In some example embodiments, the voice trigger system VTS may request the active power manager APM to enable or disable the sensor hub CHUB so that the sensor hub CHUB may be enabled.

As described above, the application processor, the electronic device including the application processor and the method of operating the application processor according to example embodiments may perform the voice trigger operation with low power and high efficiency by integrating the voice trigger system in the application processor. The on-chip voice trigger system may perform some operations instead of a host processor in the application processor to reduce the power consumption and enhance the performance of the electronic device.

In addition, the at least a part of the voice trigger system may be changed from the idle state to the normal state based on the first interrupt signal that is received through the interrupt pad separated from the pads receiving the trigger input signal and/or the audio input-output pads and is generated when the operating environment is changed from the low noise environment to the noisy environment. Further, the at least a part of the voice trigger system may be changed from the normal state to the idle state based on the second interrupt signal that is received through the interrupt pad and is generated when the operating environment is changed from the noisy environment to the low noise environment. Accordingly, overall power consumption of the voice trigger system may be further reduced.

The inventive concept may be applied to various integrated circuits, electronic devices and electronic systems supporting the voice trigger function. For example, the inventive concept may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An application processor comprising:
   a system bus;
   a host processor electrically connected to the system bus;
   a voice trigger system electrically connected to the system bus, the voice trigger system being configured to perform a voice trigger operation and issue a trigger event based on a trigger input signal that is provided through a trigger interface; and
   an interrupt pad configured to receive a first interrupt signal in response to an operating environment changing from a low noise environment in which an external sound pressure is less than a reference sound pressure, to a noisy environment in which the external sound pressure is greater than or equal to the reference sound pressure, and
   wherein at least a part of the voice trigger system is changed from an idle state to a normal state to perform the voice trigger operation in response to the first interrupt signal being received.

2. The application processor of claim 1, wherein:
   the interrupt pad is configured to further receive a second interrupt signal in response to the operating environment changing from the noisy environment to the low noise environment, and
   wherein the at least a part of the voice trigger system is changed from the normal state to the idle state to stop the voice trigger operation in response to the second interrupt signal being received.

3. The application processor of claim 2, further comprising:
   an alive block configured to always maintain an active state regardless of an active mode and a sleep mode of the system bus and the host processor, and
   wherein the interrupt pad is disposed in the alive block.

4. The application processor of claim 3, wherein the alive block and the interrupt pad are disposed in the voice trigger system.

5. The application processor of claim 2, wherein the voice trigger system includes:
   a trigger memory;
   a trigger interface circuit forming the trigger interface to sample and convert the trigger input signal provided from a digital microphone;
   a wrapper configured to store data provided from the trigger interface circuit in the trigger memory; and
   a trigger processor configured to perform the voice trigger operation based on the data stored in the trigger memory,
   wherein the trigger processor is changed from the idle state to the normal state in response to the first interrupt signal being received, and
   wherein the trigger processor is changed from the normal state to the idle state in response to the second interrupt signal being received.

6. The application processor of claim 5, wherein:
   at least one of the trigger memory, the trigger interface circuit and the wrapper is further changed from the normal state to the idle state in response to the second interrupt signal being received, and
   a portion of the trigger memory maintains previous information stored during the normal state after the trigger memory is changed from the normal state to the idle state.

7. The application processor of claim 5, further comprising:
an RC oscillator configured to generate a clock signal,
wherein a microphone clock signal is provided to the trigger interface by dividing the clock signal from the RC oscillator, and
wherein generation of the microphone clock signal based on the clock signal from the RC oscillator is stopped in response to the second interrupt signal being received.

8. The application processor of claim 2, further comprising:
an audio subsystem electrically connected to the system bus, the audio subsystem being configured to process an audio stream through an audio interface, and
wherein the interrupt pad is disposed in the audio subsystem.

9. The application processor of claim 8, wherein the audio subsystem includes:
a Bluetooth input pad configured to receive an audio input signal from a Bluetooth module; and
a Bluetooth output pad configured to transfer an audio output signal to the Bluetooth module, and
wherein the interrupt pad is a Bluetooth interrupt pad that receives the first interrupt signal and the second interrupt signal from the Bluetooth module.

10. The application processor of claim 8, wherein the audio subsystem includes:
a universal serial bus (USB) input pad configured to receive an audio input signal from a USB module; and
a USB output pad configured to transfer an audio output signal to the USB module, and
wherein the interrupt pad is a USB interrupt pad that receives the first interrupt signal and the second interrupt signal from the USB module.

11. The application processor of claim 8, further comprising:
a mail box module configured to support a synchronization of a data communication between the voice trigger system and the audio subsystem, and
wherein the first interrupt signal and the second interrupt signal received from the interrupt pad are transferred to the voice trigger system through the mail box module.

12. The application processor of claim 2, further comprising:
a sensor hub electrically connected to the system bus, the sensor hub being configured to process signals provided from at least one sensor, and
wherein the interrupt pad is disposed in the sensor hub.

13. The application processor of claim 12, further comprising:
a mail box module configured to support a synchronization of a data communication between the voice trigger system and the sensor hub, and
wherein the first interrupt signal and the second interrupt signal received from the interrupt pad are transferred to the voice trigger system through the mail box module.

14. The application processor of claim 1, wherein all of the system bus, the host processor, the voice trigger system and the interrupt pad are integrated in a single semiconductor chip.

15. The application processor of claim 1, wherein the voice trigger system is power-gated and enabled independently of the host processor.

16. An electronic device comprising:
at least one audio input-output device; and
an application processor comprising:
a system bus;
a host processor electrically connected to the system bus;
a voice trigger system electrically connected to the system bus, the voice trigger system being configured to perform a voice trigger operation and issue a trigger event based on a trigger input signal that is provided from the at least one audio input-output device through a trigger interface; and
an interrupt pad configured to receive a first interrupt signal from the at least one audio input-output device when an operating environment of the electronic device is changed from a low noise environment in which an external sound pressure is less than a reference sound pressure, to a noisy environment in which the external sound pressure is greater than or equal to the reference sound pressure, and
wherein at least a part of the voice trigger system is changed from an idle state to a normal state to perform the voice trigger operation in response to the first interrupt signal being received.

17. The electronic device of claim 16, wherein:
the interrupt pad is configured to further receive a second interrupt signal when the operating environment is changed from the noisy environment to the low noise environment, and
wherein the at least a part of the voice trigger system is changed from the normal state to the idle state to stop the voice trigger operation in response to the second interrupt signal being received.

18. The electronic device of claim 17, wherein the at least one audio input-output device includes:
a digital microphone configured to provide the trigger input signal to the voice trigger system and detect the low noise environment and the noisy environment to generate the first interrupt signal and the second interrupt signal.

19. The electronic device of claim 18, wherein:
the application processor further includes an RC oscillator configured to generate a clock signal,
a microphone clock signal is provided to the trigger interface by dividing the clock signal from the RC oscillator,
the digital microphone operates based on the microphone clock signal provided from the application processor,
the microphone clock signal provided from the application processor to the digital microphone is blocked when the digital microphone generates the second interrupt signal and the application processor receives the second interrupt signal,
the digital microphone includes an internal RC oscillator configured to generate a second microphone clock signal, and
the digital microphone operates based on the second microphone clock signal from the internal RC oscillator when the microphone clock signal provided from the application processor to the digital microphone is blocked.

20. A method of operating an application processor, the method comprising:
performing, by a voice trigger system, a voice trigger operation based on a trigger input signal provided through a trigger interface to issue a trigger event, the voice trigger system being integrated with a host processor, an interrupt pad and a system bus electrically connecting the host processor and the voice trigger system in a single semiconductor chip forming the application processor;

receiving a first interrupt signal through the interrupt pad when an operating environment is changed from a low noise environment in which an external sound pressure is less than a reference sound pressure, to a noisy environment in which the external sound pressure is greater than or equal to the reference sound pressure; and changing at least a part of the voice trigger system from an idle state to a normal state to perform the voice trigger operation in response to the first interrupt signal being received.

* * * * *